US012804742B2

(12) United States Patent
Tenny et al.

(10) Patent No.: US 12,804,742 B2
(45) Date of Patent: Nov. 17, 2026

(54) CONNECTION ESTABLISHMENT FOR UE-TO-UE RELAY

(71) Applicant: MediaTek Singapore Pte. Ltd., Singapore (SG)

(72) Inventors: Nathan Edward Tenny, San Jose, CA (US); Guillaume Sebire, Oulu (FI); Xuelong Wang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 642 days.

(21) Appl. No.: 17/734,116

(22) Filed: May 2, 2022

(65) Prior Publication Data

US 2022/0264676 A1 Aug. 18, 2022

Related U.S. Application Data

(63) Continuation of application No. PCT/CN2021/074338, filed on Jan. 29, 2021.

(30) Foreign Application Priority Data

Feb. 3, 2020 (WO) ................ PCT/CN2020/074177

(51) Int. Cl.
*H04W 76/14* (2018.01)
*H04W 12/065* (2021.01)
*H04W 88/04* (2009.01)

(52) U.S. Cl.
CPC ......... *H04W 76/14* (2018.02); *H04W 12/065* (2021.01); *H04W 88/04* (2013.01)

(58) Field of Classification Search
CPC ... H04W 76/14; H04W 12/065; H04W 88/04; H04W 12/06; H04W 76/12; H04L 63/0281; H04L 63/0884
See application file for complete search history.

(56) References Cited

U.S. PATENT DOCUMENTS 12,408,215 B2 * 9/2025 Wang .................... H04W 24/10
2016/0270134 A1 * 9/2016 Stojanovski .......... H04W 40/00
(Continued)

FOREIGN PATENT DOCUMENTS

CN 105075219 A * 11/2015 ......... H04L 12/2834
KR 20140025553 A * 3/2014 ............ H04W 12/06

OTHER PUBLICATIONS

3GPP TR 23.752 V0.23.0 (Feb. 20, 2019) (Year: 2019).*
(Continued)

*Primary Examiner* — Congvan Tran

(74) *Attorney, Agent, or Firm* — Helen Mao; Zheng Jin; Imperium Patent Works

(57) ABSTRACT

A method of connection establishment for UE-to-UE relay in a cellular communication system is proposed. A sidelink interface is used for two remote UEs to communicate directly with a relay UE, and in which the relay UE forwards communications between the remote UEs to allow end-to-end communication between the remote UEs. In one embodiment, a first remote UE initiates a single Direct Communication (DC) Request that triggers the establishment of multiple connections between the first remote UE and the relay UE, and between a second remote UE and the relay UE, such that end-to-end relayed transport is available between the first and second remote UE, with hop-by-hop security. The first and second remote UE can make use of the end-to-end relayed transport to authenticate and establish end-to-end secured connection.

22 Claims, 6 Drawing Sheets

(56) References Cited

U.S. PATENT DOCUMENTS

| | | | | |
|---|---|---|---|---|
| 2017/0317740 | A1* | 11/2017 | Basu Mallick | H04W 52/0229 |
| 2018/0213577 | A1* | 7/2018 | Burbidge | H04W 76/10 |
| 2022/0116841 | A1* | 4/2022 | Tenny | H04W 36/0009 |
| 2023/0026316 | A1* | 1/2023 | Chen | H04W 68/00 |
| 2023/0093763 | A1* | 3/2023 | Liu | H04W 76/14 370/315 |
| 2023/0180313 | A1* | 6/2023 | Freda | H04W 76/14 370/310 |

OTHER PUBLICATIONS

PCT Search Report and Written Opinion of PCT/CN2021/074338, mailed on Apr. 15, 2021 (9 pages).

Telefonica pCR to 23.779 Solution 1-3; Application level Device to Device Relay Operation for off-network MCPTT 3GPP TSG-SA WG6 Meeting #4 S6-150478 May 29, 2015 section 5.1.3.

China IP Office, search report and OA for application 202180004705.9, mailed on Apr. 8, 2023 (11 pages). No English translation is available.

R2-1710550, Huawei, HiSilicon, "Why is PC5 PDCP Missing from L2 Relaying Radio Protocol Stack?" 3GPP TSG RAN WG2 Meeting #99bis, Oct. 9-13, 2017.

R2-1701341, Huawei, "Why is PC5 PDCP Missing from L2 Relaying Radio Protocol Stack?" 3GPP TSG RAN WG2 Meeting #97, Feb. 13-17, 2017.

R2-1701933, LG, Electronics INC., "RRC connection establishment for idle and connected relay UE", 3GPP TSG RAN WG2 Meeting #97, Feb. 13-17, 17, 2017.

S6-150478, pCR to 23.779 Solution 1-3; Application Level Device to Device Relay Operation for off- network, 3GPP TSG-SA WG6 Meeting #4, May 25-29, 2015.

* cited by examiner

CONNECTION ESTABLISHMENT FOR UE-TO-UE RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/074338, with an international filing date of Jan. 29, 2021, which in turn claims priority from International Application No. PCT/CN2020/074177, entitled "Connection establishment for a UE-to-UE relay," filed on Feb. 3, 2020. This application is a continuation of International Application No. PCT/CN2021/074338, which claims priority from International Application No. PCT/CN2020/074177. International Application No. PCT/CN2021/074338 is pending as of the filing date of this application, and the United States is a designated state in International Application No. PCT/CN2021/074338. The disclosure of each of the foregoing documents is incorporated herein by reference.

TECHNICAL FIELD

The disclosed embodiments relate generally to wireless network communications, and, more particularly, to UE-to-UE sidelink relaying in 5G new radio (NR) wireless communications systems.

BACKGROUND

In 3GPP LTE cellular networks, an evolved universal terrestrial radio access network (E-UTRAN) includes a plurality of base stations, e.g., evolved Node-Bs (eNodeBs or eNBs) communicating with a plurality of mobile stations referred as user equipment (UEs). New technologies in 5G new radio (NR) allow cellular devices to connect directly to one another using a technique called sidelink communications. Sidelink is the new communication paradigm in which cellular devices are able to communicate without their data via the network. The sidelink interface may also be referred to as a PC5 interface. A variety of applications may rely on communication over the sidelink interface, such as vehicle-to-everything (V2X) communication, public safety (PS) communication, direct file transfer between user devices, and so on.

In a sidelink UE-to-network relaying architecture, a relay UE is served directly by a network node such as an eNB (LTE) or a gNB (NR), and the relay UE offers service over a sidelink interface to one or more remote UEs. In some other cases, however, there may be a need for two UEs to communicate when they do not have direct visibility to each other over the sidelink interface (for example, due to being out of range with one another, or due to the intervention of an obstacle to radio frequency propagation). In these cases it may be beneficial for a third UE to provide relayed communication between the first and second UEs. In this situation, the third UE may be referred to as a relay UE, and the first and second UEs as remote UEs, endpoint UEs, etc. Such an arrangement may be described as a UE-to-UE relay (contrasted with a UE-to-network relay, in which a relay UE provides relaying of traffic between a remote UE and network infrastructure).

For UE-to-UE relay, there is a need for a procedure that allows the remote UEs to initially establish communication with the relay UE, followed by using the connectivity through the relay UE to establish a logical connection that allows direct communication between the remote UEs.

SUMMARY

A method of connection establishment for UE-to-UE relay in a cellular communication system is proposed. A sidelink interface is used for two remote UEs to communicate directly with a relay UE, and in which the relay UE forwards communications between the remote UEs to allow end-to-end communication between the remote UEs. The methods described are applicable to both layer 2 (L2) and layer 3 (L3) relaying architectures, in which the traffic to be relayed is carried at either L2 or L3 of a protocol stack. In one embodiment, a first remote UE initiates a single Direct Communication (DC) Request that triggers the establishment of multiple connections between the first remote UE and the relay UE, and between a second remote UE and the relay UE, such that end-to-end relayed transport is available between the first and second remote UE, with hop-by-hop security (that is, security applied separately to the "first hop" between the first remote UE and the relay UE and the "second hop" between the second remote UE and the relay UE). The first and second remote UE can make use of the end-to-end relayed transport to authenticate and establish end-to-end secured connection.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
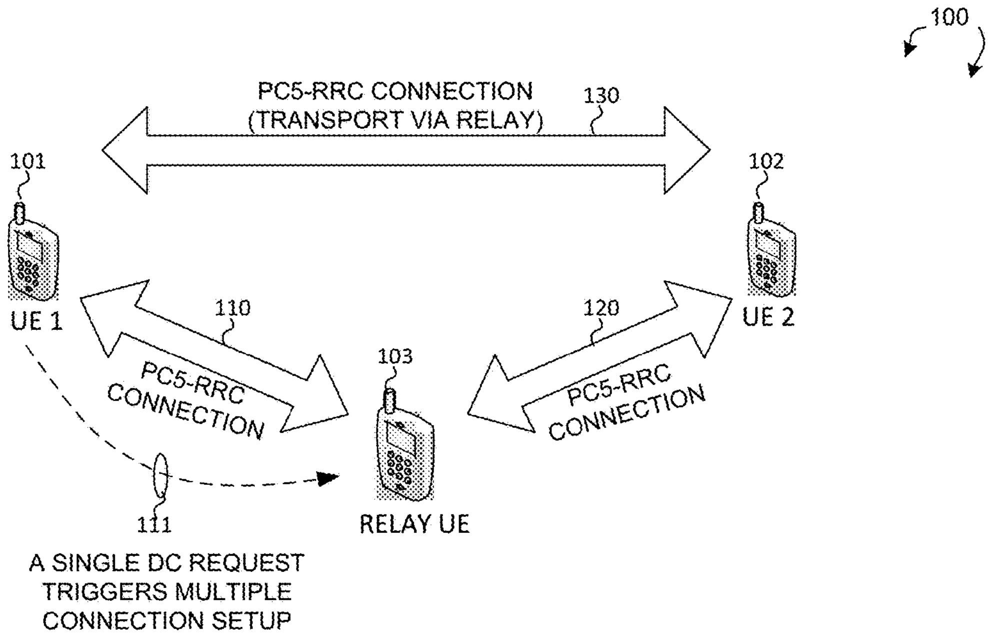
FIG. 1 illustrates a wireless cellular communications system supporting UE-to-UE relay in accordance with a novel aspect.

FIG. 1 illustrates a wireless cellular communications system 100 supporting UE-to-UE relay in accordance with a novel aspect. 5G new radio (NR) mobile communication network 100 comprises a 5G core (5GC) network and a radio access network (not shown) that may provide cellular service for a plurality of user equipments (UEs) including UE 101, UE 102, and UE 103. Alternatively, one or more of UEs 101, 102, and 103 may be out of coverage of a cellular system. Various cellular systems, including both 4G/LTE and 5G/NR systems, may provide a facility known as a sidelink interface, which allows UEs in the system to communicate directly, without the use of any network infrastructure. The sidelink interface may also be referred to as a PC5 interface. A variety of applications may rely on communication over the sidelink interface, such as vehicle-to-everything (V2X) communication, public safety (PS) communication, direct file transfer between user devices, and so on.

A sidelink interface allows direct device-to-device communication between UEs. When two UEs that want to communicate are not in close enough proximity to use the sidelink directly, or when direct communication between the two UEs is impractical (due to interference, obstructions, or other factors, for example), they may rely on a third "relay UE" to route their communications. In such a situation, the first two UEs may be referred to as remote UEs, endpoint UEs, and so on. Typically, the endpoint UEs in this situation cannot detect one another directly but need to rely on the relay UE to establish communication between them. Thus there is a need for a procedure that allows the remote UEs to initially establish communication with the relay UE, followed by using the connectivity through the relay UE to establish a logical connection that allows direct communication between the remote UEs. It is noted that various protocol architectures to support relaying are possible, and in consequence, the logical connection between the remote UEs may take various forms, such as a radio resource control (RRC) connection, a routing path of an internet protocol (IP), etc.

For a UE-to-UE relay to operate, a communication path must be established between the remote UEs via the relay UE. Such a communication path allows packets of a service to be delivered from one remote UE to the other remote UE, using the relay UE as an intermediary. In either a layer-2 (L2) or layer-3 (L3) UE-to-UE relay architecture, when communication is established between the remote UEs and the relay UE, there is a need to establish radio-level connections (for instance, PC5-RRC connections) between the remote UEs and the relay UE. These radio-level connections allow management of the protocol layers that terminate between the relay UE and the remote UEs. In the example of FIG. 1, UE 101 and UE 102 are two remote UEs, they are also referred to as UE1 and UE2; and UE 103 is a relay UE, which provides UE-to-UE relay service for remote UE1 and remote UE2. The PC5-RRC connection 110 between UE1 and the relay UE, and the PC5-RRC connection 120 between UE2 and the relay UE, may be negotiated by direct signalling over the sidelink interface, but the PC5-RRC connection 130 between UE1 and UE2 must be negotiated using signalling relayed by the relay UE, since UE1 and UE2 may not have the ability to communicate directly with one another over the sidelink.

In accordance with one novel aspect, methods of connection establishment for UE-to-UE relay are proposed. A sidelink interface is used for two remote UEs to communicate directly with a relay UE, which forwards communications between the remote UEs, to allow end-to-end communication between the remote UEs. The methods described are applicable to both L2 and L3 relaying architectures, in which the traffic to be relayed is carried at either L2 or L3 of a protocol stack. In a preferred embodiment of FIG. 1, remote UE1 first initiates a single Direct Communication (DC) Request message 111, which triggers the establishment of multiple connections between UE1 and the relay UE and between remote UE2 and the relay UE, such that end-to-end relayed transport is available between UE1 and UE2, with hop-by-hop security. Finally, UE1 and UE2 make use of the end-to-end relayed transport to authenticate and establish an end-to-end secured connection.

Figure 2:
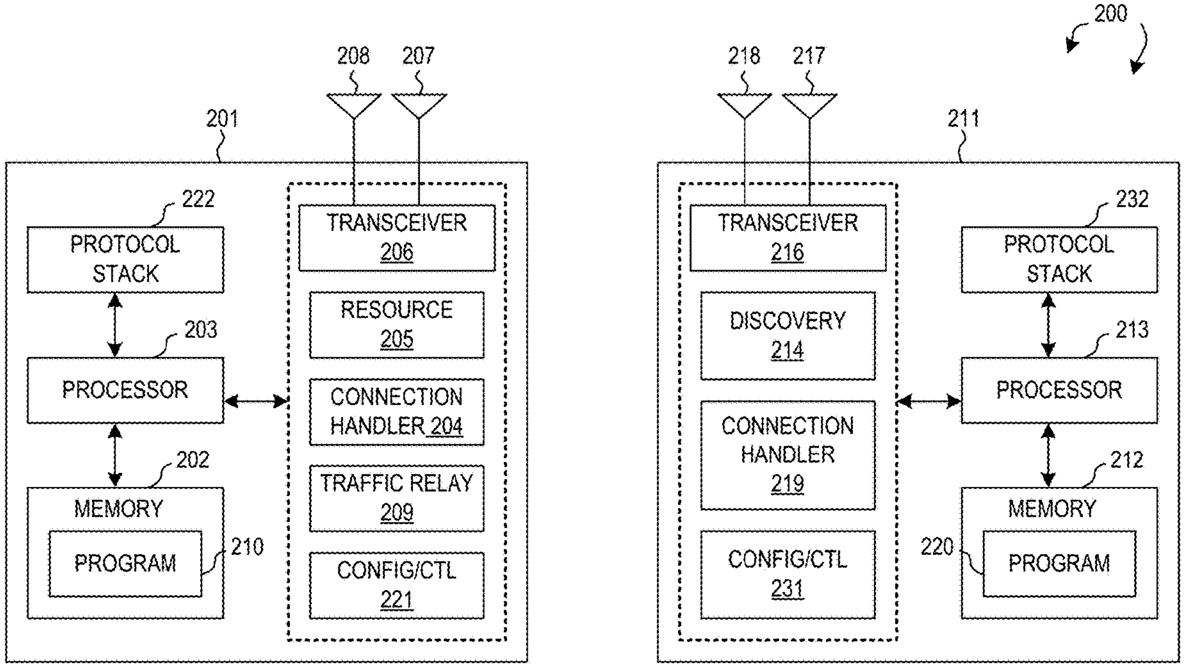
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote UE), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a resource management circuit 205 for allocating and scheduling sidelink resources, a connection handling circuit 204 for establishing and managing connections, a traffic relay handling controller 209 for relaying all or part of control signalling and/or data traffic for remote UEs, and a control and configuration circuit 221 for providing control and configuration information. Wireless device 211 is a remote UE that includes a protocol stack 232, a relay discovery circuit 214 for discovering relay UEs, a connection handling circuit 219 for establishing and managing connections, and a configuration and control circuit 231.

The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly. In one example, a first remote UE sends an initiating message to a relay UE via the connection handling circuit, which triggers multiple connections to be established between the first remote UE and the relay UE and between the relay UE and a second remote UE. Based on the established end-to-end relayed transport, an end-to-end secured connection can be established between the first remote UE and the second remote UE.

Figure 3:
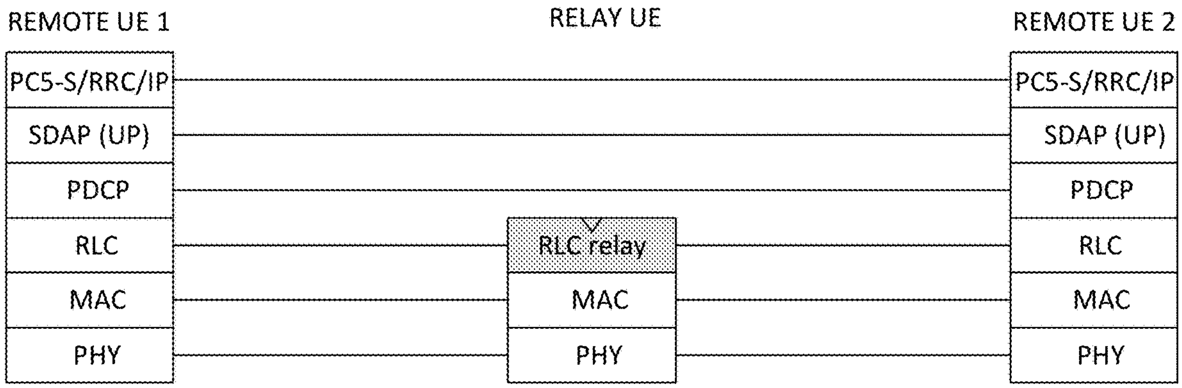
FIG. 3 illustrates a layer 2 relaying architecture for UE-to-UE relay.

FIG. 3 illustrates a layer 2 (L2) relaying architecture for UE-to-UE relay. In the first exemplary protocol stack of FIG. 3, the relaying operation occurs at the Radio Link Control (RLC) sublayer of L2. The lower layers of the protocol stack, including a physical (PHY) layer, a medium access control (MAC) layer, and an RLC layer, are terminated between the relay UE and each remote UE, with service data units (SDUs) of the RLC protocol relayed between the two links at the relay UE. The upper layers of the protocol stack, including a packet data convergence protocol (PDCP) layer, a service data adaptation protocol (SDAP) layer in the case of user plane (UP) operation, and upper layers that may comprise a PC5 radio resource control (PC5-RRC) protocol, a PC5 signalling (PC5-S) protocol, and/or IP, are terminated end-to-end between remote UE1 and remote UE2. This protocol stack is applicable to both control and user plane operation, with different upper-layer protocols for the two cases. In particular, the L2 protocol stack allows for control and management of a PC5-RRC connection between the two remote UEs, using the relay UE as a communications intermediary but without any involvement of the relay UE in the actual protocol operations for connection control. For example, remote UE1 may send PC5-RRC messages to remote UE2 (and vice versa) to configure aspects of a PC5-RRC connection, such as the configuration of the protocol stack, the configuration of sidelink data radio bearers (SLRBs or DRBs), and so on.

Figure 4:
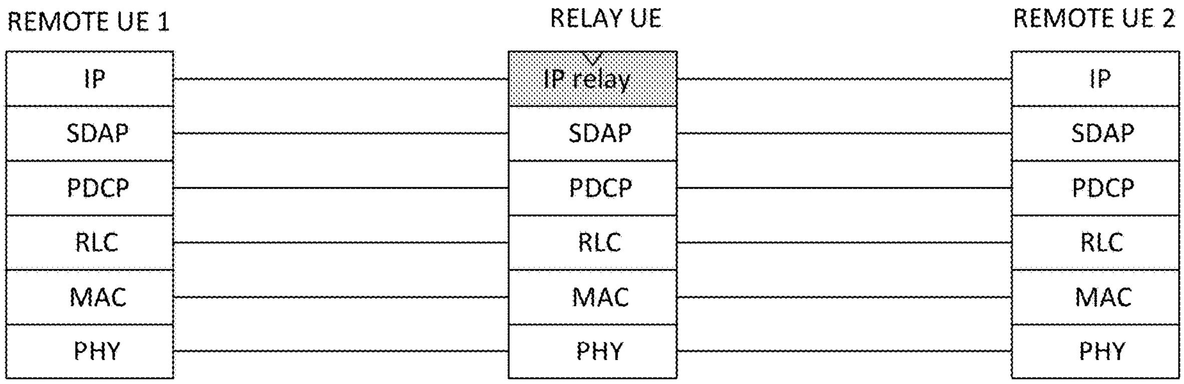
FIG. 4 illustrates a layer 3 relaying architecture for UE-to-UE relay.

FIG. 4 illustrates a layer 3 (L3) relaying architecture for UE-to-UE relay. In the second exemplary protocol stack of FIG. 4, the relaying operation occurs at the IP layer of L3. All the protocol layers (a PHY layer, a MAC layer, an RLC layer, a PDCP layer, an SDAP layer, and an IP layer) are terminated between the relay UE and each remote UE, with IP packets relayed at the relay UE. This allows IP traffic to flow between the remote UEs via the relay UE, while each radio link is managed separately between the relay UE and a remote UE. In some examples, the IP addresses of the remote UEs may be link-local for each of the two radio links and assigned by the relay UE, with the relay UE performing network address translation (NAT) to route IP packets to the remote UEs. In other examples, the IP addresses of the remote UEs may be known to both remote UEs and routable between the remote UEs, with the relay UE serving as an IP router.

In either a L2 or L3 UE-to-UE relay architecture, when communication is established between the remote UEs and the relay UE, there is a need to establish radio-level connections (for instance, PC5-RRC connections) between the remote UEs and the relay UE. These radio-level connections allow management of the protocol layers that terminate between the relay UE and the remote UEs. The PC5-RRC connections between UE1 and the relay UE, and between UE2 and the relay UE, may be negotiated by direct signalling over the sidelink interface, but the PC5-RRC connection between UE1 and UE2 must be negotiated using signalling relayed by the relay UE, since UE1 and UE2 may not have the ability to communicate directly with one another over the sidelink. The basic message flow to setup a PC5-RRC connection follows the existing art, which results in the following steps.

First, an initiating UE sends a Direct Communication (DC) Request message of a PC5-S protocol to a target UE. Second, the initiating UE and the target UE exchange messages to authenticate and establish a security association. Third, the target UE sends a Direct Communication Accept message to the initiating UE, completing the setup of a PC5-S connection. Fourth, the initiating and target UEs automatically consider a PC5-RRC connection to be established based on the PC5-S connection. In a relaying environment, where the remote UEs may not have the ability to communicate directly to one another on the sidelink, none of these steps can occur between the remote UEs as described above; to provide connectivity between the remote UEs, the relay UE must become involved in the communications for connection setup.

Figure 5:
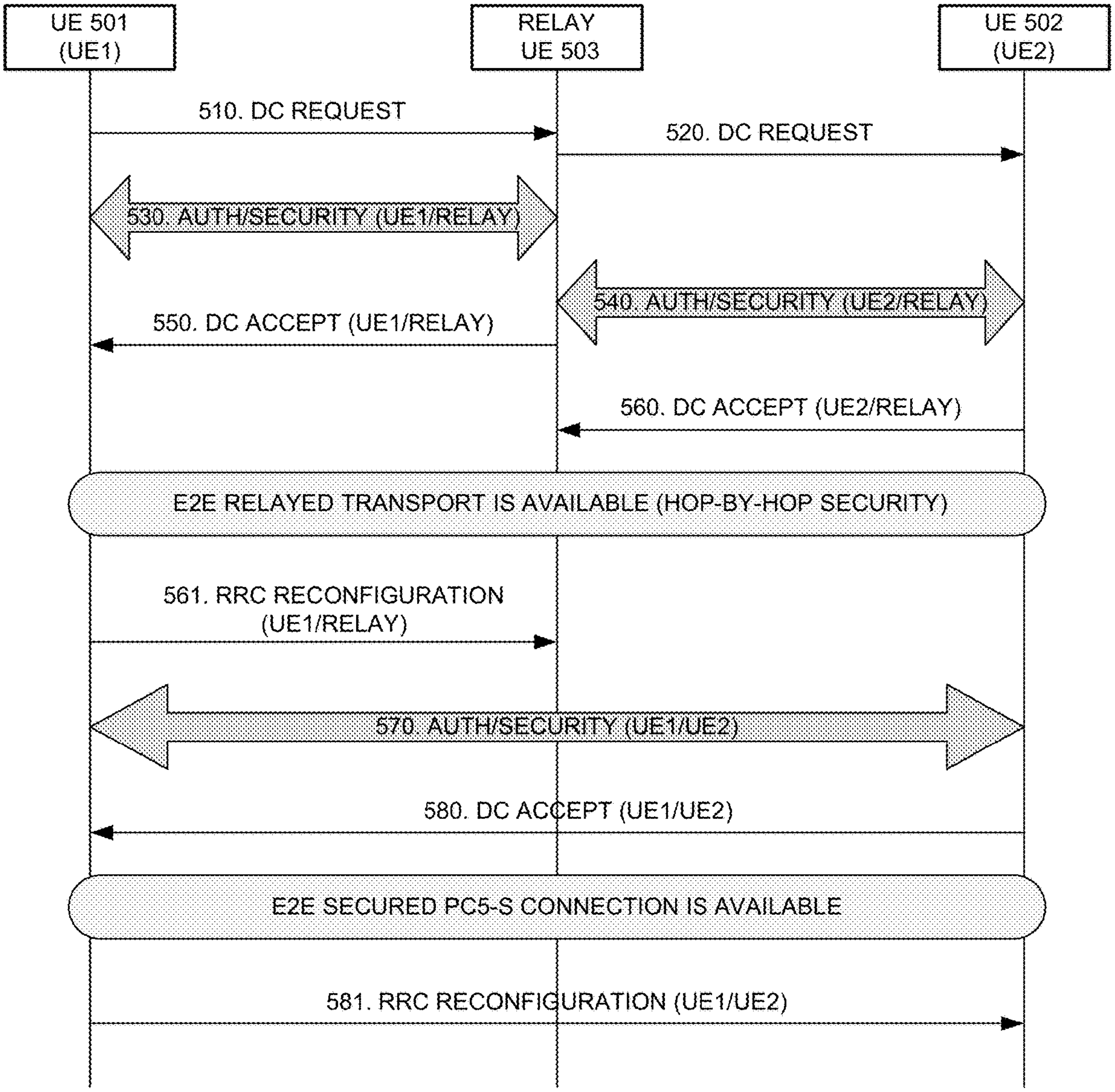
FIG. 5 illustrates a sequence flow of a first embodiment of UE-to-UE relay between relay and remote UEs in accordance with one novel aspect.

FIG. 5 illustrates a sequence flow of a first embodiment of UE-to-UE relay between relay and remote UEs in accordance with one novel aspect. In step 510 of FIG. 5, UE 501 (which will become one of the remote UEs once a relaying relationship is established) sends an initiating message, such as a Direct Communication Request message of a PC5-S protocol. This initiating message may be sent by broadcast, for example, if an application layer of the initiating UE did not provide an identifier for the target UE. Alternatively, the initiating message may be sent by unicast, that is, addressed specifically to UE 502. The initiating message is received by the relay UE 503. However, it may not be received by UE 502, for instance, because of a lack of radio connectivity on the sidelink interface between UE 501 and UE 502.

It is noted that in the case where the initiating message is sent by unicast (addressed to UE 502), the flow of FIG. 5 assumes that the relay UE 503 knows it should receive and process the initiating message, even though the message is addressed to UE 502 rather than the relay UE 503. This may be achieved in several ways. As one example, the relay UE 503 may maintain knowledge of other UEs in its radio environment that could be considered as remote UEs, and when it receives the initiating message addressed to UE 502, the relay UE 503 may recognise UE 502 as a candidate remote UE.

In step 520 of FIG. 5, the relay UE 503 forwards the initiating message to UE 502. The forwarded message may maintain the original transmission mode and addressing from step 510. That is, if the message in step 510 is sent by broadcast, then the message in step 520 may also be sent by broadcast; and if the message in step 510 was sent by unicast, then the message in step 520 may also be sent by unicast. Other information in the message in step 520 may be modified or appended to indicate that the message has been relayed. For instance, an identity of the relay UE 503 may be included as a source or a secondary source of the message, and in case the said identity of the relay UE 503 is a secondary source of the message, an identity of the primary source from which the message is relayed i.e. in this case UE 501, is also included.

In step 530 of FIG. 5, the relay UE 503 and UE 501 negotiate authentication and establish a security association. This step may use the same signalling and procedures as used for general sidelink communication. In other words, authentication and establishment of security between the relay UE and UE 501 may not be affected by the relaying architecture. In step 540 of FIG. 5, the relay UE 503 and UE 502 negotiate authentication and establish a security association. This step may likewise use the existing signalling and procedures.

In step 550 of FIG. 5, after authentication and security establishment are complete, the relay UE 503 may determine that it accepts the establishment of communication with UE 501 and transmit a response message, for example, a Direct Communication Accept message of a PC5-S protocol. This step may complete the establishment of a PC5-S connection between the relay UE 503 and UE 501, and the relay UE 503 and UE 501 may autonomously consider that a corresponding PC5-RRC connection is established (not shown in the figure).

Similarly, in step 560 of FIG. 5, UE 502 may determine that it accepts the establishment of communication with the relay UE 503 and transmit a response message, for example, a Direct Communication Accept message of a PC5-S protocol, potentially resulting in the establishment of a PC5-S connection and a corresponding PC5-RRC connection between UE 502 and the relay UE. This determination may take into account said other information in the message received in step 520 indicating that the message has been relayed. At this stage, connections are established between UE 501 and the relay UE 503, and between UE 502 and the relay UE 503, meaning that end-to-end relayed transport is available. However, security can only be hop-by-hop, meaning that a communication from UE 501 to UE 502 can be secured (for example, ciphered and/or integrity-protected) from UE 501 to the relay UE 503, and from the relay UE 503 to UE 502, but it cannot be secured end-to-end between UE 501 and UE 502. The relay UE 503 has access to the communication without security protection, meaning that the relay UE 503 can read the contents of the communication (since it terminates ciphering) and/or modify the contents of the communication (since it terminates integrity).

After steps 550 and 560 have completed and secure communication is available between the remote UE 501 and UE 502, further signalling may occur, for example, to configure the radio communication layers between the relay UE and the remote UEs. In one example of a L2 architecture, UE 501 in step 561 may send a reconfiguration message of a PC5-RRC protocol to the relay UE to configure the PHY, MAC, and RLC layers of the link between UE 501 and the relay UE. In another example of a L3 architecture, UE 501 in step 561 may send a reconfiguration message of a PC5-RRC protocol to the relay UE to configure the PHY, MAC, RLC, PDCP, and SDAP layers of the link between UE 501 and the relay UE.

It is noted that steps 530/550 and steps 540/560 of FIG. 5 may be asynchronous with one another. In other words, the relay UE may establish connections with UE 501 and UE 502 independently. For instance, steps 530 and 540 may overlap in time (in this case the relay UE would be establishing security with both UE 501 and UE 502 simultaneously). Similarly, step 560 may occur before step 550. Only when both of steps 550 and 560 have completed will the end-to-end relayed transport between UE 501 and UE 502 be available, however. With the end-to-end relayed transport, remote UE 501 may send a transmission to the relay UE with addressing/routing information indicating that the transmission is intended for remote UE 502; remote UE 501 may receive a transmission from the relay UE with addressing/routing information indicating that the transmission came from remote UE 502.

In step 570 of FIG. 5, UE 501 and UE 502 make use of the end-to-end relayed transport to authenticate and establish security between them. This step may make use of existing procedures of a protocol such as a PC5-S protocol. It is noted that the establishment of security does not require an end-to-end secure link a priori. Therefore, step 570 can proceed even though, as noted above, the link between UE 501 and UE 502 (through the relay UE) only has hop-by-hop security. The messages in step 570 are transmitted from a remote UE 501 to the relay UE, and forwarded by the relay UE to the other remote UE 502; however, for purposes of the figure, the relaying is shown as transparent.

In step 580 of FIG. 5, UE 502 may determine that it accepts the establishment of communication and transmit a response message, for instance, a Direct Communication Accept message of a PC5-S protocol. Like the messages in step 570, the response message is forwarded by the relay; that is, it is sent first by UE 502 to the relay UE 503, and then forwarded by the relay UE 503 to UE 501. However, for purposes of the figure, the relaying is shown as transparent. After step 580 has completed, a PC5-S connection is established between UE 501 and UE 502, with end-to-end secured transport available for communication between UE 501 and UE 502. Subsequently, UE 501 and UE 502 may autonomously consider that a PC5-RRC connection is established between them, and they may use this PC5-RRC connection for subsequent signalling, such as a reconfiguration message of a PC5-RRC protocol to configure the radio layers of the protocol stack for communication between UE 501 and UE 502. For example, in a L2 relaying architecture, UE 501 may send a reconfiguration message of a PC5-RRC protocol to UE 502 to configure the PDCP and SDAP layers of the link between UE 501 and UE 502 (step 581).

As noted above, configuration of the IP layers of the connections is outside the scope of the PC5-RRC protocol. If configuration of the IP layer is required on any of the three established connections (for example, to allocate IP addresses to the remote UEs), the flow of FIG. 5 could be expanded to include additional signalling of a higher-layer protocol such as a PC5-S protocol. Particularly in a L3 relaying architecture, such additional signalling might be necessary before relayed transport is available. For instance, there might be additional PC5-S signalling between UE 501 and the relay UE after step 550, between UE 502 and the relay UE after step 560, and/or between UE 501 and UE 502 after step 580.

Figure 6:
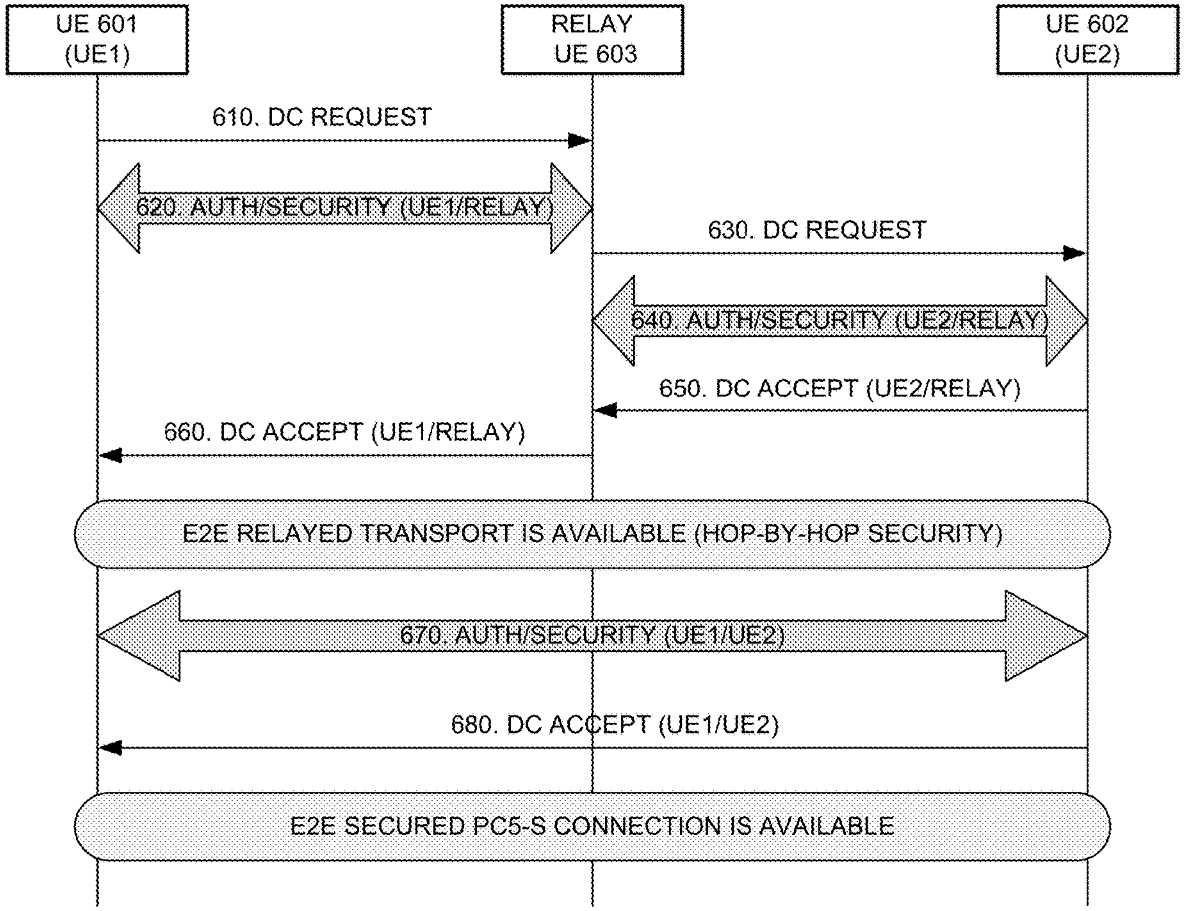
FIG. 6 illustrates a sequence flow of a second embodiment of UE-to-UE relay between relay and remote UEs in accordance with one novel aspect.

FIG. 6 illustrates a sequence flow of a second embodiment of UE-to-UE relay between relay and remote UEs in accordance with one novel aspect. A disadvantage of the flow shown in FIG. 5 is that the relay UE sets up the PC5-S connection with UE 501 without knowing if it will successfully establish communication with UE 502. As a result, error cases are possible in which UE 501 and the relay UE establish a PC5-S connection successfully and communicate over it, but the relay UE and UE 502 fail to establish a PC5-S connection (for example, due to a failure of radio connectivity between them, or due to requirements of other services that make it impossible for UE 502 to allocate resources for the proposed service advertised by UE 501). The consequence is a waste of radio resources for the connection setup between UE 501 and the relay UE, and an inconvenient requirement to tear down the connection between UE 501 and the relay UE after setting it up. A message flow that achieves a similar end-to-end connection setup without this disadvantage is shown in FIG. 6 as an alternative embodiment.

FIG. 6 can be seen as a special case of FIG. 5, in which the signalling between the relay UE and the remote UEs is constrained to occur in a particular order. In step 610 of FIG. 6, UE 601 sends an initiating message (e.g., a Direct Communication Request message of a PC5-S protocol) to the relay UE 603, as in step 510 of FIG. 5. In step 620 of FIG. 6, the relay UE 603 and UE 601 perform authentication and establish a security relationship, as in step 530 of FIG. 5. In step 630 of FIG. 6, the relay UE forwards the initiating message to UE 602, as in step 520 of FIG. 5. In step 640 of FIG. 6, the relay UE 603 and UE 602 perform authentication and establish a security relationship, as in step 540 of FIG. 5. In step 650 of FIG. 6, UE 602 sends a response message (e.g., a Direct Communication Accept message of a PC5-S protocol) to the relay UE 603, as in step 560 of FIG. 5.

In step 660 of FIG. 6, the flow diverges from FIG. 5, in that the relay UE 603 waits to send a response message (for instance, a Direct Communication Accept message of a PC5-S protocol) to UE 601 until after it has completed the connection establishment with UE 602. This dependency addresses the deficiency described above in FIG. 5. If there is a problem in the connection setup procedure with UE 602, then the relay UE 603 will not finish setting up the connection with UE 601, since there is no value in doing so. Rather, it may send a rejection message (for example, a Direct Communication Reject message of a PC5-S protocol) to UE 601 to indicate that the requested connection will not be set up. Assuming the relay UE 603 sends the response message as shown in step 660, steps 670 and 680 of FIG. 6 are the same as steps 570 and 580 of FIG. 5: remote UE 601 and remote UE 602 perform authentication and establish security, after which remote UE 602 sends a response message (for instance, a Direct Communication Accept message of a PC5-S protocol) to remote UE 601.

As a variation on FIG. 6, it is also possible for step 620 to be delayed until after step 650; that is, the relay UE does not perform authentication and establish security with UE 601 until the relay UE is sure that it can communicate with UE 602. This approach has some benefit in efficiency for the failure case, since if the connection setup with UE 602 fails, the signalling overhead of step 620 can be avoided. However, this variation may also expose the relay UE to spurious connection attempts from an unauthorised device in the role of UE 601, which could constitute a low-grade denial-of-service attack. There is thus a trade-off between efficiency and the risk of such an attack, and depending on how likely and how significant the attack scenario is considered, either the flow of FIG. 6 or the variation with the delayed step 620 might be preferable in a real deployment.

Figure 7:
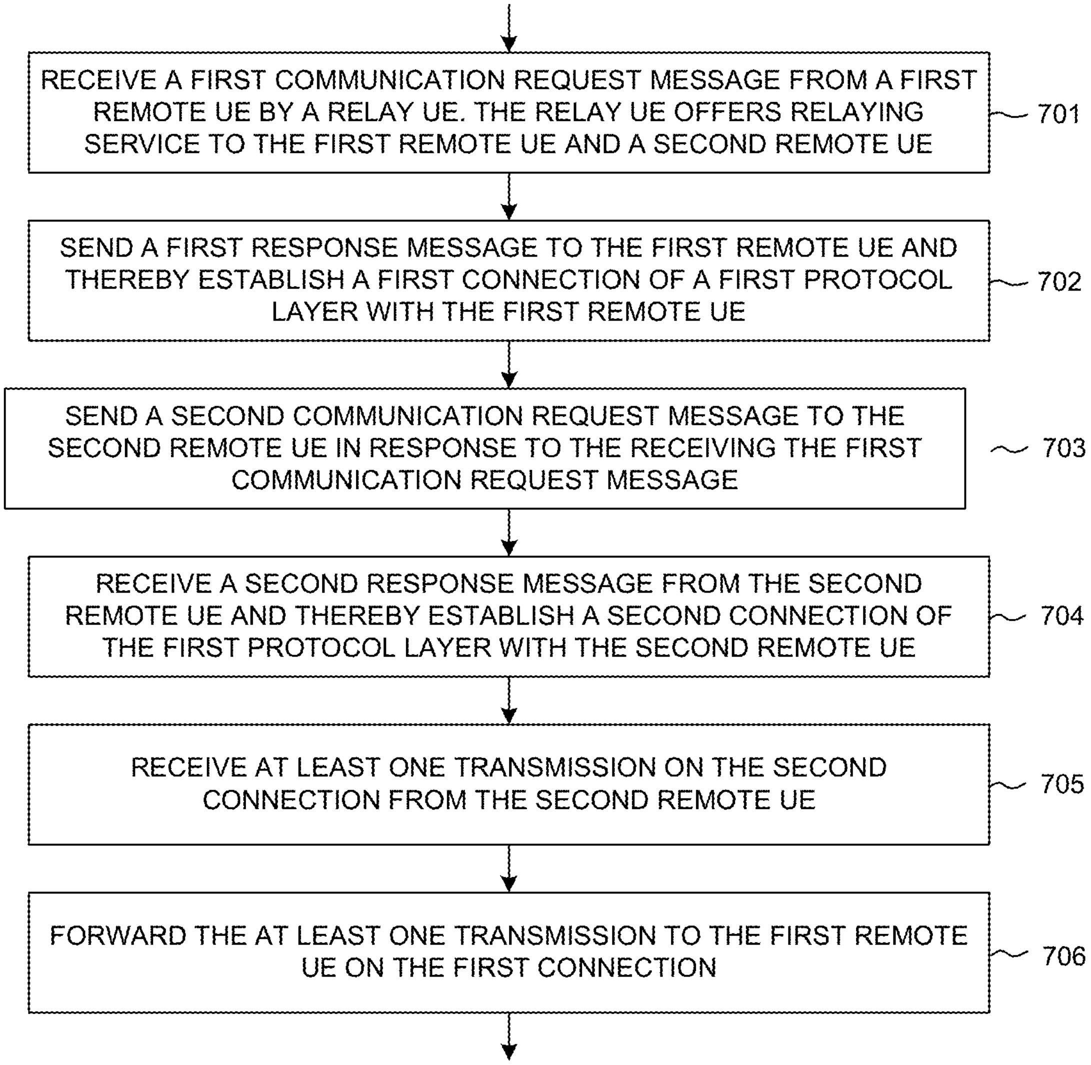
FIG. 7 is a flow chart of a method of UE-to-UE relay from relay UE perspective in accordance with one novel aspect.

FIG. 7 is a flow chart of a method of UE-to-UE relay from relay UE perspective in accordance with one novel aspect. In step 701, a relay UE receives a first communication request message from a first remote UE. The relay UE offers relay service between the first remote UE and a second remote UE. In step 702, the relay UE sends a first response message to the first remote UE and thereby establishing a first connection of a first protocol layer with the first remote UE. In step 703, the relay UE sends a second communication request message to a second remote UE in response to the receiving the first communication request message. In step 704, the relay UE receives a second response message from the second remote UE and thereby establishes a second connection of the first protocol layer with the second remote UE. In step 705, the relay UE receives at least one transmission on the second connection from the second remote UE. In step 706, the relay UE forwards the at least one transmission to the first remote UE on the first connection.

Figure 8:
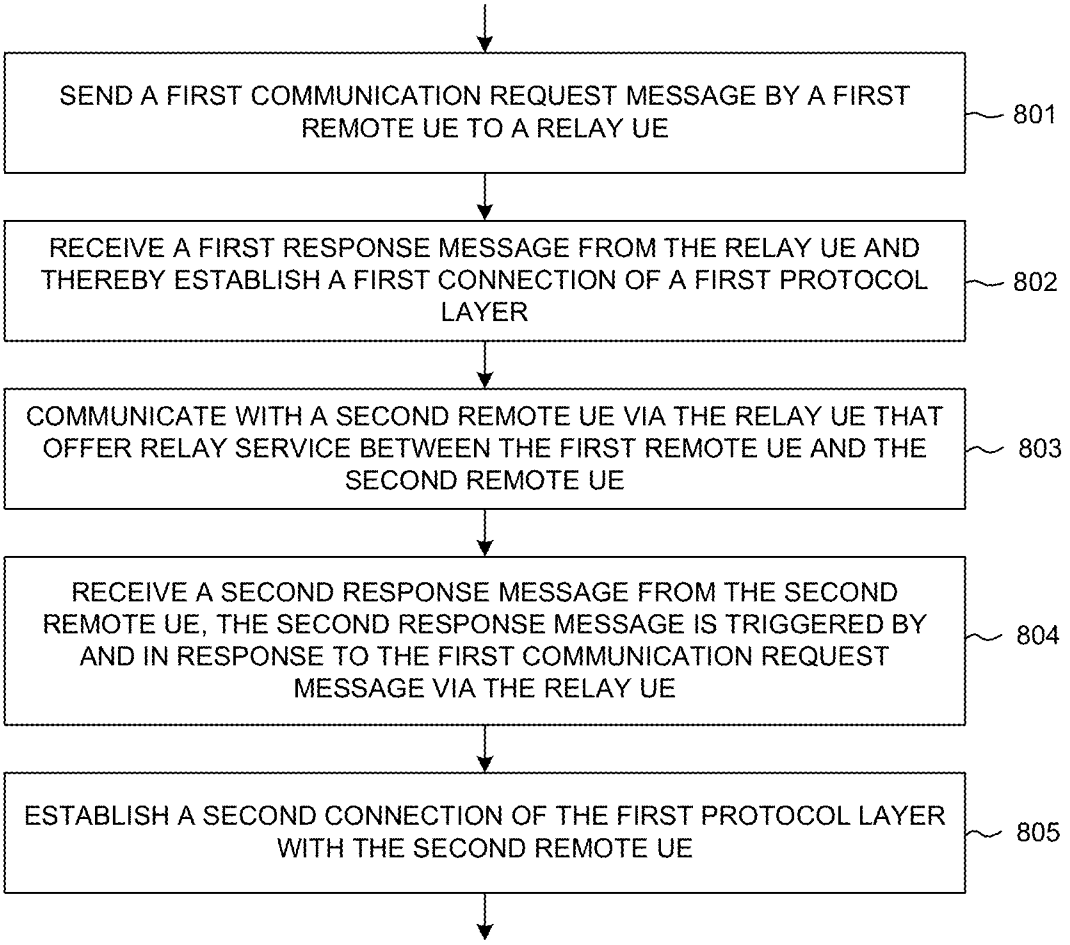
FIG. 8 is a flow chart of a method of UE-to-UE relay from remote UE perspective in accordance with one novel aspect.

FIG. 8 is a flow chart of a method of UE-to-UE relay from remote UE perspective in accordance with one novel aspect. In step 801, a remote UE sends a first communication request message to a relay UE that offers relay service between the first remote UE and the second remote UE. In step 802, the remote UE receives a first response message from the relay UE and thereby establishes a first connection of a first protocol layer with the relay UE. In step 803, the remote UE communicates with a second remote UE via the relay UE. In step 804, the remote UE receives a second response message from the second remote UE. The second response message is triggered by and in response to the first communication request message via the relay UE. In step 805, the remote UE establishes a second connection of the first protocol layer with the second remote UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

receiving a first communication request message from a first remote user equipment (UE) by a relay UE, wherein the relay UE offers relay service between the first remote UE and a second remote UE;

sending a first response message to the first remote UE and thereby establishing a first connection of a first protocol layer with the first remote UE;

sending a second communication request message to a second remote UE in response to the receiving the first communication request message;

receiving a second response message from the second remote UE and thereby establishing a second connection of the first protocol layer with the second remote UE;

receiving at least one transmission on the second connection from the second remote UE; and forwarding the at least one transmission to the first remote UE on the first connection, wherein the first remote UE and the second remote UE establishes end-to-end security in response to the second response message.

2. The method of claim 1, further comprising:

configuring the first remote UE with a first configuration of a second protocol layer; and configuring the second remote UE with a second configuration of the second protocol layer.

3. The method of claim 2, wherein the configuring the first UE and the second UE involves using the first protocol layer.

4. The method of claim 1, wherein the establishment of the first connection comprises:

performing a first authentication operation with the first remote UE; and establishing a first security relationship with the first remote UE and the sending the first response message to the first remote UE.

5. The method of claim 1, wherein the establishment of the second connection comprises:

performing a second authentication operation with the second remote UE; and establishing a second security relationship with the second remote UE and the receiving the second response message from the second remote UE.

6. The method of claim 4, wherein the sending the first response message occurs after the receiving the second response message.

7. The method of claim 4, wherein the performing the first authentication operation occurs after the receiving the second response message.

8. The method of claim 1, wherein the first communication request message is addressed to a broadcast address, or is addressed to an address of the second remote UE.

9. A method comprising:

sending a first communication request message by a first remote user equipment (UE) to a relay UE that offers relay service between the remote UE and a second remote UE;

receiving a first response message from the relay UE and thereby establishing a first connection of a first protocol layer with the relay UE;

communicating with the second remote UE via the relay UE;

receiving a second response message from the second remote UE, wherein the second response message establishes an end-to-end relay transport layer for authentication between the first remote UE and the second remote UE; and establishing a second connection of the first protocol layer with the second remote UE subsequent to the authentication performed via the end-to-end relay transport layer.

10. The method of claim 9, wherein the establishing of the first connection comprises:

performing a first authentication with the relay UE; and establishing a first security relationship with the relay UE and the receiving the first response message from the relay UE.

11. The method of claim 9, wherein the establishing of the second connection comprises:

performing a second authentication with the second remote UE; and establishing a second security relationship with the second remote.

12. The method of claim 9, further comprising:

receiving a configuration of a second protocol layer from the relay UE;

applying the configuration of the second protocol layer; and communicating with the second remote UE according to the configuration of the second protocol layer.

13. The method of claim 9, wherein the first communication request message is addressed to a broadcast address, or is addressed to an address of the second remote UE.

14. The method of claim 9, wherein the first remote UE sends a configuration message using the first protocol layer to the relay UE over the first connection.

15. The method of claim 9, wherein the first remote UE sends a configuration message using the first protocol layer to the second remote UE over the second connection.

16. A Remote User Equipment (UE) comprising:

a transmitter that sends a first communication request message to a relay UE that offers relay service between the remote UE and a second remote UE;

a receiver that receives a first response message from the relay UE and thereby establishing a first connection of a first protocol layer with the relay UE, wherein the remote UE communicates with the second remote UE via the relay UE; and a connection handling circuit that establishes a second connection of the first protocol layer with the second remote UE upon receiving a second response message from the second remote UE, wherein the second response message establishes an end-to-end relay transport layer for authentication between the first remote UE and the second remote UE.

17. The remote UE of claim 16, wherein the remote UE establishes the first connection upon performing a first authentication with the relay UE, establishing a first security relationship with the relay UE, and receiving the first response message.

18. The remote UE of claim 16, wherein the remote UE establishes the second connection upon performing a second authentication with the second remote UE, establishing a second security relationship with the second remote UE.

19. The remote UE of claim 16, wherein the remote UE receives a configuration of a second protocol layer from the relay UE, applies the configuration of the second protocol layer, and communicates with the second remote UE according to the configuration of the second protocol layer.

20. The remote UE of claim 16, wherein the first communication request message is addressed to a broadcast address, or is addressed to an address of the second remote UE.

21. The remote UE of claim 16, wherein the remote UE sends a configuration message using the first protocol layer to the relay UE over the first connection.

22. The remote UE of claim 16, wherein the remote UE sends a configuration message using the first protocol layer to the second remote UE over the second connection.

* * * * *